(12) United States Patent
Starkweather et al.

(10) Patent No.: US 7,283,112 B2
(45) Date of Patent: Oct. 16, 2007

(54) REFLECTIVE MICROELECTRICAL MECHANICAL STRUCTURE (MEMS) OPTICAL MODULATOR AND OPTICAL DISPLAY SYSTEM

(75) Inventors: Gary K Starkweather, Bellevue, WA (US); Michael J. Sinclair, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 888 days.

(21) Appl. No.: 10/086,397

(22) Filed: Mar. 1, 2002

(65) Prior Publication Data
US 2003/0164814 A1 Sep. 4, 2003

(51) Int. Cl.
G09G 3/34 (2006.01)
G02B 26/00 (2006.01)
G02B 5/08 (2006.01)
G02B 7/182 (2006.01)

(52) U.S. Cl. ............... 345/84; 345/108; 359/290; 359/291; 359/295; 359/850

(58) Field of Classification Search .......... 345/30–111; 359/291, 290, 295, 850
See application file for complete search history.

(56) References Cited

U.S. PATENT DOCUMENTS

| | | | |
|---|---|---|---|
| 5,481,396 A * | 1/1996 | Ji et al. ............... 359/295 |
| 5,504,629 A * | 4/1996 | Lim ............... 359/850 |
| 5,640,266 A | 6/1997 | Engle | |
| 5,640,479 A * | 6/1997 | Hegg et al. ............... 385/120 |
| 5,671,083 A | 9/1997 | Conner et al. | |
| 5,729,386 A * | 3/1998 | Hwang ............... 359/618 |
| 6,137,623 A * | 10/2000 | Roberson et al. ............... 359/291 |
| 6,275,325 B1 | 8/2001 | Sinclair | |
| 6,329,967 B1 * | 12/2001 | Little et al. ............... 345/55 |
| 6,351,051 B1 | 2/2002 | Sinclair et al. | |
| 6,353,492 B2 * | 3/2002 | McClelland et al. ............... 359/254 |
| 6,422,011 B1 | 7/2002 | Sinclair | |

(Continued)

FOREIGN PATENT DOCUMENTS

EP 0831352 A1 * 3/1998

(Continued)

OTHER PUBLICATIONS

European Patent Office "European Search Report" for Application 03002121.6, Examiner Fazio, V., Date of completion Jun. 16, 2003, Berlin.

(Continued)

*Primary Examiner*—Sumati Lefkowitz
*Assistant Examiner*—Srilakshmi K Kumar (57) ABSTRACT

A MEMS optical display system includes an illumination source for providing illumination light, a collimating lens for receiving the illumination light and forming from it collimated illumination light, and a microlens array having an array of lenslets for receiving the illumination light from the collimating lens. The converging microlens array directs the illumination light through an array of pixel apertures in an aperture plate to a microelectrical mechanical reflector array positioned opposite the aperture plate. The microelectrical mechanical reflector array includes an array of microelectrical mechanical actuators that support reflectors in alignment with the array of pixel apertures and selectively orients the reflectors to direct the illumination light back through the pixel apertures (to form part of a display image) or against the aperture plate (to be blocked). The illumination light passing back through the pixel apertures passes through the microlens array and a beamsplitter to a display screen.

23 Claims, 10 Drawing Sheets

U.S. PATENT DOCUMENTS

| | | | |
|---|---|---|---|
| 6,456,420 B1 | 9/2002 | Goodwin-Johansson | |
| 6,465,929 B1 | 10/2002 | Levitan et al. | |
| 6,501,107 B1 | 12/2002 | Sinclair et al. | |
| 6,587,612 B1 | 7/2003 | Mitchell et al. | |
| 6,650,460 B2 * | 11/2003 | Kurematsu | 359/291 |
| 6,654,156 B1 * | 11/2003 | Crossland et al. | 359/290 |
| 6,657,759 B2 | 12/2003 | Muller | |
| 6,675,578 B1 | 1/2004 | Sinclair | |
| 6,753,664 B2 | 6/2004 | Neufeld et al. | |
| 6,775,048 B1 | 8/2004 | Starkweather et al. | |
| 7,006,276 B2 | 2/2006 | Starkweather et al. | |
| 7,064,879 B1 | 6/2006 | Levitan et al. | |
| 2003/0184189 A1 | 10/2003 | Sinclair | |

FOREIGN PATENT DOCUMENTS

| | | |
|---|---|---|
| WO | WO 01/84531 A1 | 11/2001 |

OTHER PUBLICATIONS

Why is the Texas Instruments Digital Micromirror Device (TM) (DMD TM) so reliable?, http://www.dlp.com/dlp_technology/images/dynamic/white_papers/135_Myth.pdf, pp. 1-7, 2004.

Markandey et al., Video Processing for DLP(TM) Display Systems, http://www.dip.com/dlp_technology/images/dynamic/white_papers/131_vproc.pdf, pp. 1-12, 2004.

Hall, Control and Characterization of Line-Addressable Micromirror Arrays, Mar. 2001, http://www.stormingmedia.us/13/1302/A130293.html.

SOIMUMPs: Silicon-On-Insulator Multi User MEMS Processes, http://www.memsrus.com/figs/soimumps.pdf, pp. 1-2, 2004.

* cited by examiner

REFLECTIVE MICROELECTRICAL MECHANICAL STRUCTURE (MEMS) OPTICAL MODULATOR AND OPTICAL DISPLAY SYSTEM

FIELD OF THE INVENTION

The present invention relates to optical display systems and, in particular, to a reflective display system that employs a microelectrical mechanical system (MEMS) optical modulator.

BACKGROUND AND SUMMARY OF THE INVENTION

Flat panel optical display systems, such as liquid crystal displays, are well known and widely used. Many such displays (e.g., liquid crystal displays) require polarized illumination light. Typically, polarization of illumination light greatly attenuates the light, thereby resulting in displays with decreased brightness, or require relatively expensive optical components. Moreover, such displays commonly have relatively low contrast ratios, which decreases image clarity and overall image quality. Furthermore, such displays typically require complex or difficult manufacturing processes.

To address such shortcomings, the present invention includes a microelectrical mechanical optical display system that employs microelectrical mechanical system (MEMS) actuators to modulate light. As is known in the art, MEMS actuators provide control of very small components that are formed on semiconductor substrates by conventional semiconductor (e.g., CMOS) fabrication processes. MEMS systems and actuators are sometimes referred to as micromachined systems-on-a-chip.

In one implementation, a MEMS optical display system according to the present invention includes an illumination source for providing illumination light, a collimating lens for receiving the illumination light and forming from it collimated illumination light, and a microlens array having an array of lenslets and receiving the illumination light from the collimating lens. The converging microlens array directs the illumination light an array of pixel apertures in an aperture plate to a microelectrical mechanical reflector array positioned opposite the aperture plate.

The microelectrical mechanical reflector array includes an array of microelectrical mechanical actuators that support reflectors in alignment with the array of pixel apertures. The array of microelectrical mechanical actuators orient the reflectors selectively to direct the illumination light back through the pixel apertures (to form part of a display image) or against the aperture plate (to be blocked). The illumination light passing back through the pixel apertures pass through the microlens array and a beamsplitter to a display screen.

A MEMS optical display system according to the present invention is operable without polarized illumination light, thereby eliminating the light attenuation or expense of the polarizing illumination light. In addition, light can be completely blocked or modulated by cooperation between the MEMS reflectors and the aperture plate, thereby providing display images with very high contrast ratios. Furthermore, such MEMS actuators can be manufactured by conventional CMOS circuit manufacturing processes.

Additional objects and advantages of the present invention will be apparent from the detailed description of the preferred embodiment thereof, which proceeds with reference to the accompanying drawings.

DETAILED DESCRIPTION OF PREFERRED EMBODIMENTS

To assist with understanding the present invention, the general procedure for fabricating micromechanical devices using the MUMPs process is explained with reference to FIGS. 1-15.

The MUMPs process provides three-layers of conformal polysilicon that are etched to create a desired physical structure. The first layer, designated POLY 0, is coupled to a supporting wafer, and the second and third layers, POLY 1 and POLY 2, respectively, are mechanical layers that can be separated from underlying structure by the use of sacrificial layers that separate layers and are removed during the process.

The accompanying figures show a general process for building a micro-motor as provided by the MEMS Technology Applications Center, 3021 Cornwallis Road, Research Triangle Park, N.C.

Figure 1:
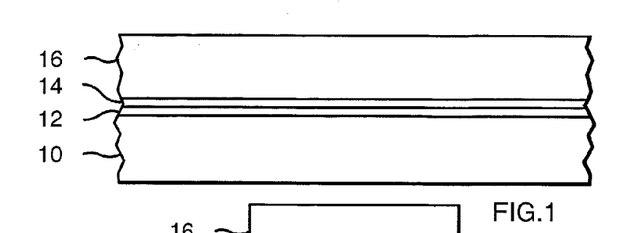
FIGS. 1-15 are cross-section views of a general multi-user MEMS process known in the prior art for fabricating microelectrical mechanical devices. Cross-hatching is omitted to improve clarity of the prior art structure and process depicted.

The MUMPs process begins with a 100 mm n-type silicon wafer 10. The wafer surface is heavily doped with phosphorus in a standard diffusion furnace using POCl 3 as the dopant source. This reduces charge feed-through to the silicon from electrostatic devices subsequently mounted on the wafer. Next, a 600 nm low-stress Low Pressure Chemical Vapor Deposition (LPCVD) silicon nitride layer 12 is deposited on the silicon as an electrical isolation layer. The silicon wafer and silicon nitride layer form a substrate.

Figure 2:
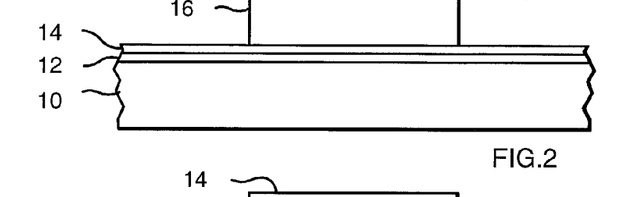
Figure 3:
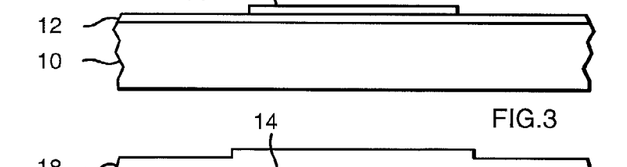

Next, a 500 nm LPCVD polysilicon film-POLY 0 14—is deposited onto the substrate. The POLY 0 layer 14 is then patterned by photolithography; a process that includes coating the POLY 0 layer with a photoresist 16, exposing the photoresist with a mask (not shown) and developing the exposed photoresist to create the desired etch mask for subsequent pattern transfer into the POLY 0 layer (FIG. 2). After patterning the photoresist, the POLY 0 layer 14 is etched in a Reactive Ion Etch (RIE) system (FIG. 3).

Figure 4:
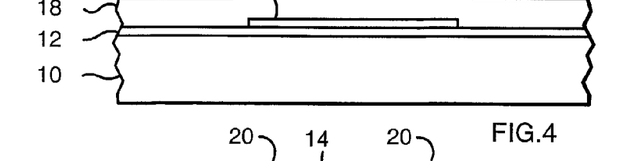
Figure 5:
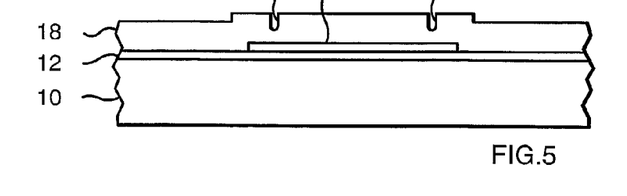
Figure 6:
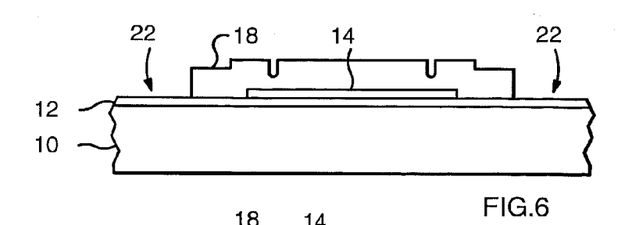
Figure 7:
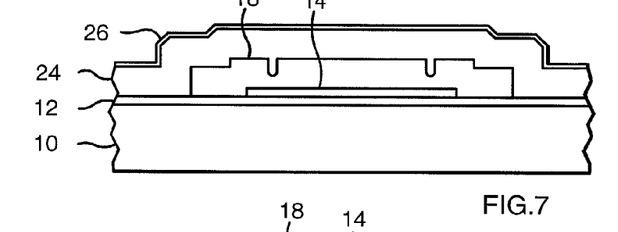
Figure 8:
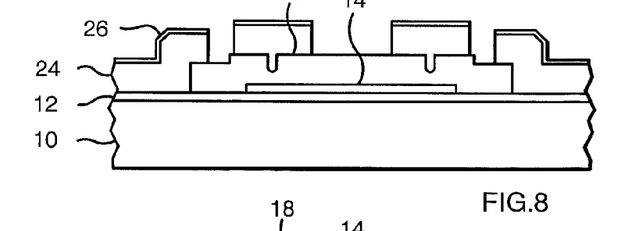

With reference to FIG. 4, a 2.0 μm phosphosilicate glass (PSG) sacrificial layer 18 is deposited by LPCVD onto the POLY 0 layer 14 and exposed portions of the nitride layer 102. This PSG layer, referred to herein as a First Oxide, is removed at the end of the process to free the first mechanical layer of polysilicon, POLY 1 (described below) from its underlying structure; namely, POLY 0 and the silicon nitride layers. This sacrificial layer 5 is lithographically patterned with a DIMPLES mask to form dimples 20 in the First Oxide layer by RIE (FIG. 5) at a depth of 750 nm. The wafer is then patterned with a third mask layer, ANCHOR 1, and etched (FIG. 6) to provide anchor holes 22 that extend through the First Oxide layer to the POLY 0 layer. The ANCHOR 1 holes will be filled in the next step by the POLY 1 layer 24.

After the ANCHOR 1 etch, the first structural layer of polysilicon (POLY 1) 24 is deposited at a thickness of 2.0 μm. A thin 200 nm PSG layer 26 is then deposited over the POLY 1 layer 24 and the wafer is annealed (FIG. 7) to dope the POLY 1 layer with phosphorus from the PSG layers. The anneal also reduces stresses in the POLY 1 layer. The POLY 1 and PSG masking layers 24, 26 are lithographically patterned to form the structure of the POLY1 layer. After etching the POLY 1 layer (FIG. 8), the photoresist is stripped and the remaining oxide mask is removed by RIE.

Figure 9:
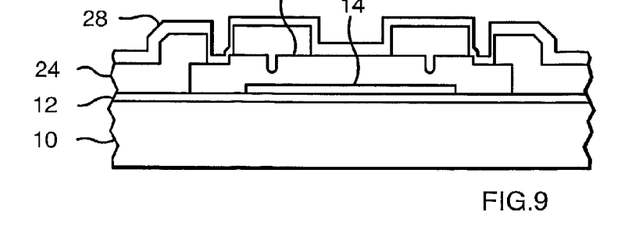

After the POLY 1 layer 24 is etched, a second PSG layer (hereinafter "Second Oxide") 28 is deposited (FIG. 9). The Second Oxide is patterned using two different etch masks with different objectives.

Figure 10:
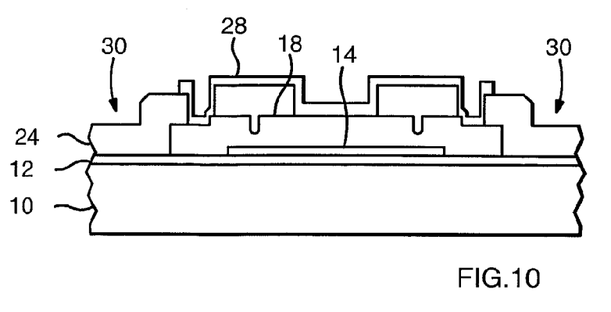

First, a POLY 1_POLY 2_VIA etch (depicted at 30) provides for etch holes in the Second Oxide down to the POLY 1 layer 24. This etch provide a mechanical and electrical connection between the POLY 1 layer and a subsequent POLY 2 layer. The POLY 1_POLY 2_VIA layer is lithographically patterned and etched by RIE (FIG. 10).

Figure 11:
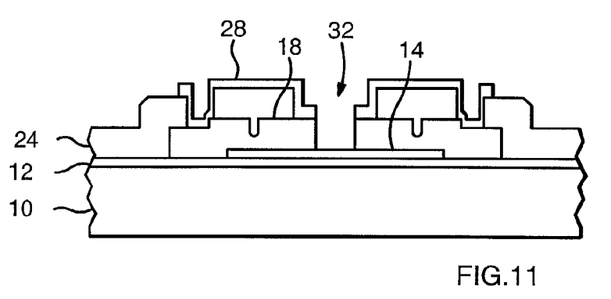
Figure 12:
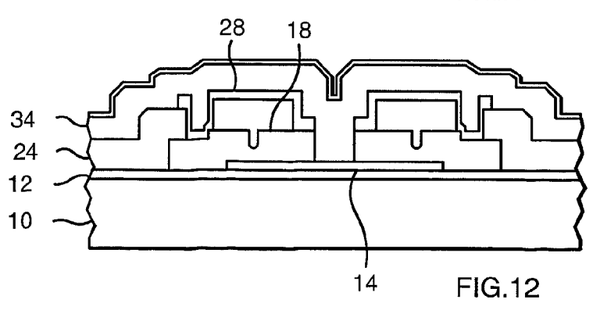

Second, an ANCHOR 2 etch (depicted at 32) is provided to etch both the First and Second Oxide layers 18, 28 and POLY 1 layer 24 in one step (FIG. 11). For the ANCHOR 2 etch, the Second Oxide layer is lithographically patterned and etched by RIE in the same way as the POLY 1_POLY 2_VIA etch. FIG. 11 shows the wafer cross section after both POLY 1_POLY 2_VIA and ANCHOR 2 etches have been completed.

Figure 13:
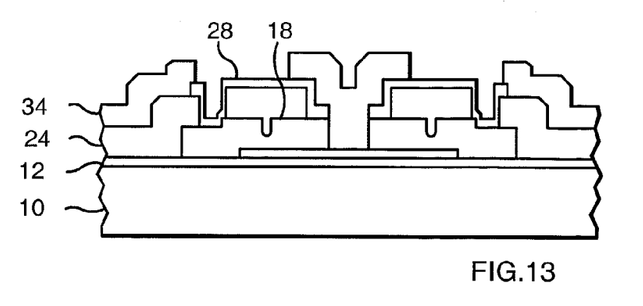

A second structural layer, POLY 2, 34 is then deposited at a thickness of 1.5 μm, followed by a deposition of 200 nm of PSG. The wafer is then annealed to dope the POLY 2 layer and reduce its residual film stresses. Next, the POLY 2 layer is lithographically patterned with a seventh mask and the PSG and POLY 2 layers are etched by RIE. The photoresist can then be stripped and the masking oxide is removed (FIG. 13).

Figure 14:
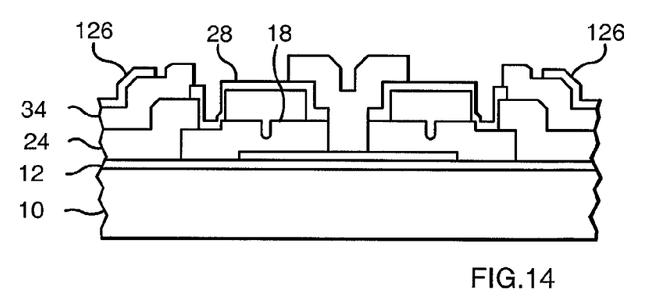

The final deposited layer in the MUMPs process is a 0.5 μm metal layer 126 that provides for probing, bonding, electrical routing and highly reflective mirror surfaces. The wafer is patterned lithographically with the eighth mask and the metal is deposited and patterned using a lift-off technique. The final, unreleased exemplary structure is shown in FIG. 14.

Figure 15:
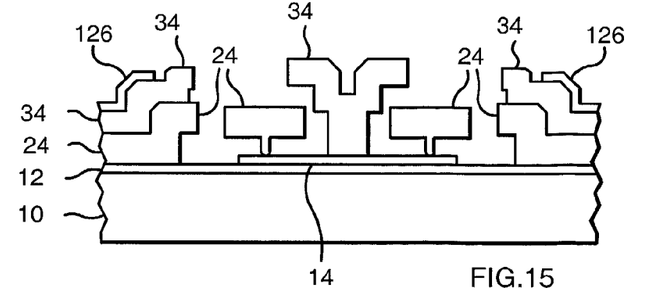

Lastly, the wafers undergo sacrificial release and test using known methods. FIG. 15 shows the device after the sacrificial oxides have been released.

In preferred embodiments, the device of the present invention is fabricated by the MUMPs process in accordance with the steps described above. However, the device of the present invention does not employ the specific masks shown in the general process of FIGS. 1-15, but rather employs masks specific to the structure of the present invention. Also, the steps described above for the MUMPs process may change as dictated by the MEMS Technology Applications Center. The fabrication process is not a part of the present invention and is only one of several processes that can be used to make the present invention.

Figure 16:
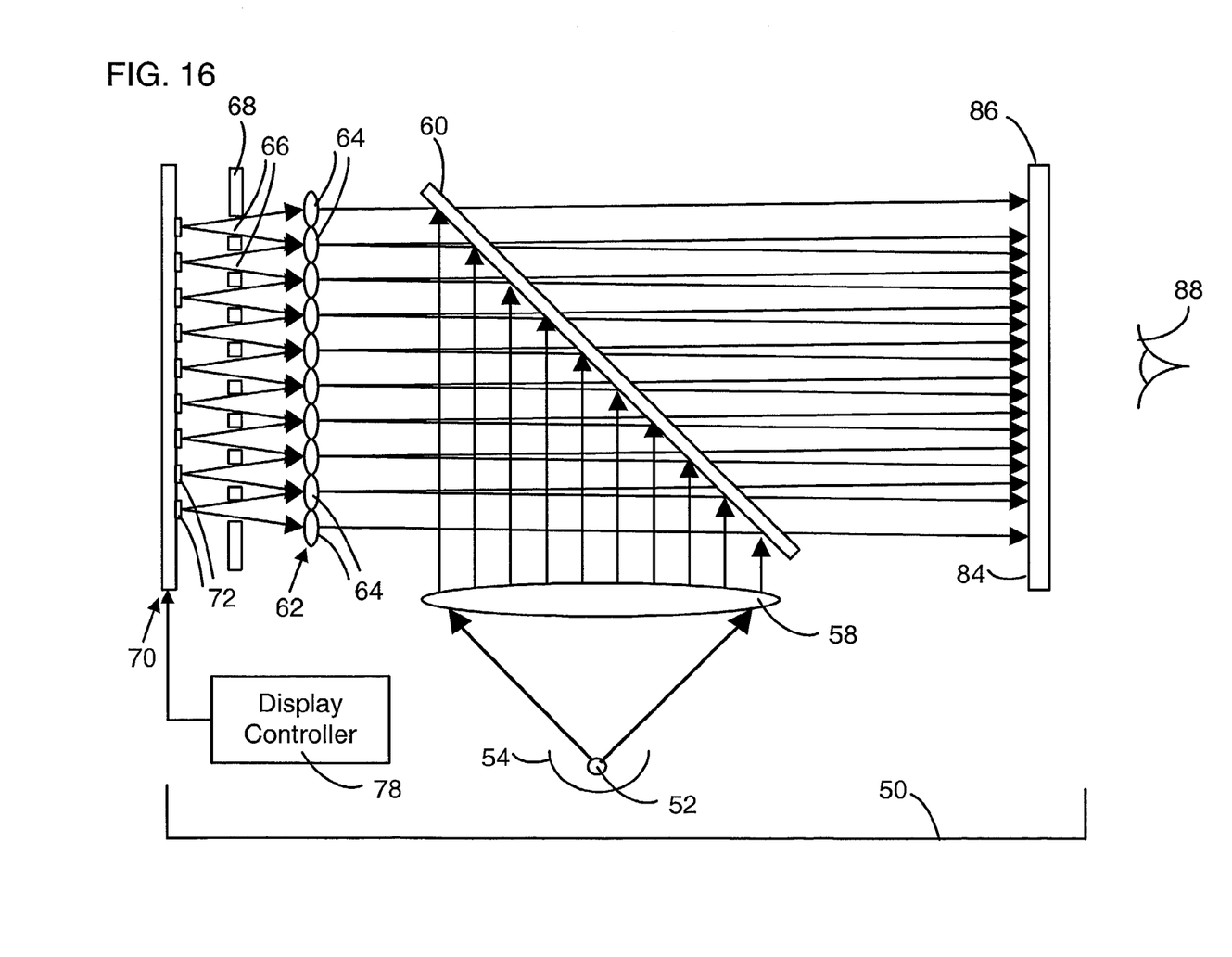
FIG. 16 an implementation of a microelectrical mechanical (MEMS) optical display system according to the present invention.

FIG. 16 is a diagrammatic side view of a microelectrical mechanical structure (MEMS) optical display system 50 according to the present invention. Display system 50 includes a light source 52 and reflector 54 that direct illumination light to a condenser lens 58. A beam splitter 60 receives the illumination light from condenser lens 58 and reflects the light toward a microlens array 62 having a two-dimensional array of lenslets 64 (only one dimension shown). Lenslets 64 of microlens array 62 receive the illumination light and focus it through apertures 66 in an aperture plate 68 toward a microelectrical mechanical structure (MEMS) reflective modulator 70. Microlens array 62 could be formed as a molded array of plastic lenses or an array of holographic lenses, also referred to as hololenses, or may be an assembled array of conventional glass lenses.

MEMS reflective modulator 70 has a two-dimensional array of microelectrical mechanical structure (MEMS) reflectors 72 that are positioned opposite corresponding apertures 66 in aperture plate 68. Each MEMS reflector 72 corresponds to a picture element or pixel and is separately controllable by a display controller 78 to selectively reflect illumination light back through an aperture 66 according to an image control signal, thereby to form a display image. For example, each MEMS reflector 72 would direct light back through its aperture 66 for an amount of time in proportion to the brightness of the corresponding pixel for a given pixel period. Light reflected by MEMS reflectors 72 through apertures 66 passes through lenslets 64 and beam splitter 60 to a rear surface 84 of a transmissive display screen 86 for viewing by an observer 88. In an alternative implementation, a projecting lens array may be positioned between beam splitter 60 and transmissive display screen 86 to enlarge or reduce the optical field so that it provides a desired image size on transmissive display screen 86. MEMS reflective modulator 70, aperture plate 68, and microlens array 62 may be considered a display engine 90 that may be compactly and efficiently manufactured for a wide range of applications.

MEMS optical display system 50 has a number of advantages over commonly available liquid crystal displays. For example, MEMS reflective modulator 70 does not require that the illumination light be polarized, in contrast to the typical operation of liquid crystal cells. This eliminates the expense and light attenuation that typically accompanies polarization. Moreover, MEMS reflective modulator 70 can pass unmodulated light with virtually no attenuation, whereas typical liquid crystal cells significantly attenuate light. Similarly, MEMS reflective modulator 70 can provide much higher contrast ratios than liquid crystal cells because light is either losslessly reflected through apertures 66 or completely blocked by aperture plate 68 to provide complete modulation of the light. Finally, MEMS reflective modulator 70 can be manufactured by conventional CMOS circuit techniques without requiring the complex processes typically required for liquid crystal displays.

In one implementation, for example, MEMS reflective modulator 70 could include a 200×200 array of MEMS reflectors 72 for controlling light passing through a corresponding 200×200 array of apertures 66. In this implementation, for example, microlens array 62 could include 200×200 lenslets 64 that each have a focal length of about 1 mm, and apertures 66 may be positioned in a right, regular array with separations of about 50 µm between them. MEMS reflective modulator 70 in such an implementation could have dimensions of 1 cm ×1 cm. With lenslets 64 of projection microlens array 62 providing magnification of about 2.5, display screen 86 could have dimensions of about 2.5 cm ×2.5 cm, or about 1 inch ×1 inch.

Figure 17:
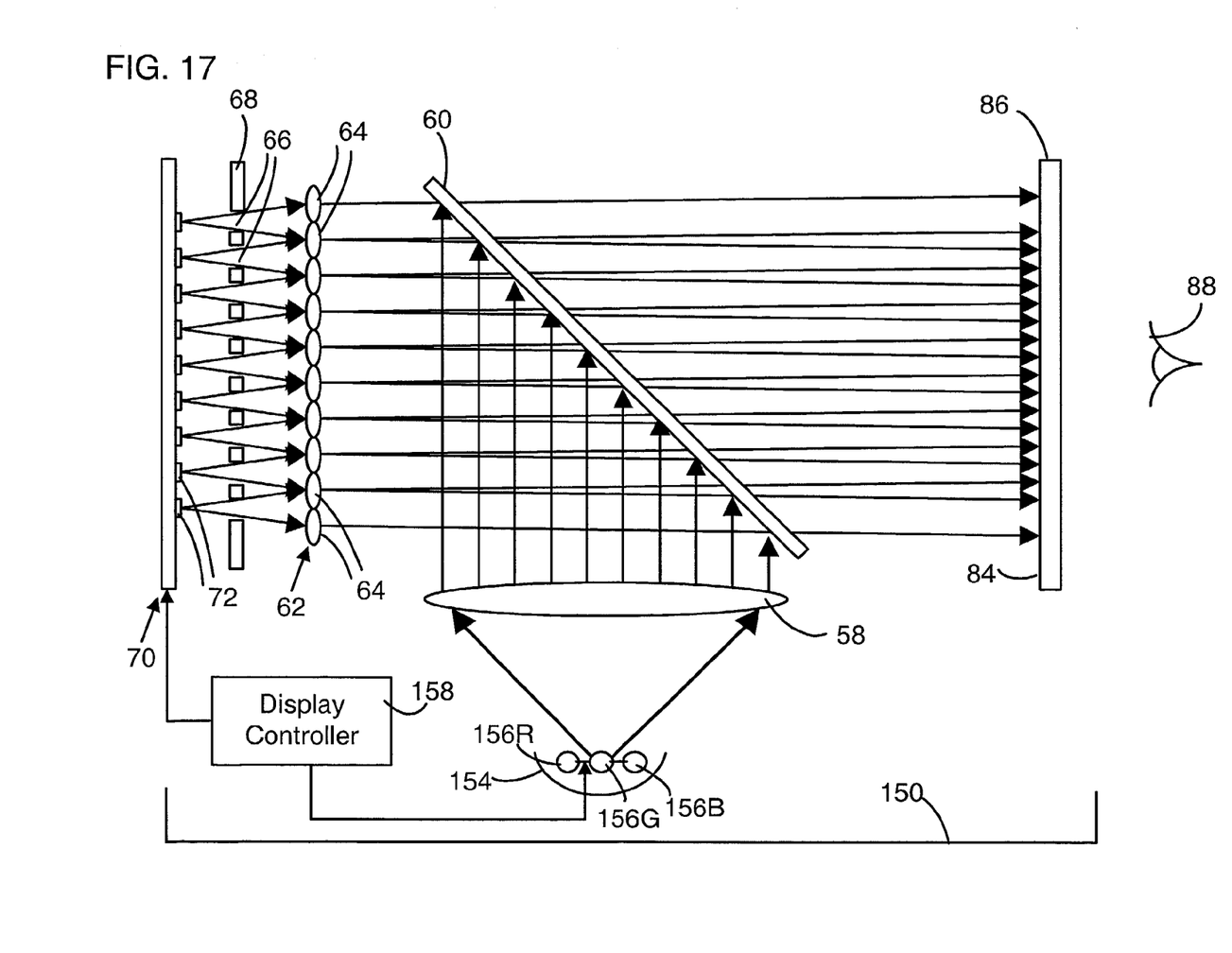
FIG. 17 is another implementation of a microelectrical mechanical (MEMS) optical display system according to the present invention.

FIG. 17 is a diagrammatic side view of a microelectrical mechanical structure (MEMS) optical display system 150 showing one implementation of a polychromatic illumination source 152 and an associated reflector 154. Components of MEMS optical display system 150 that are generally the same as those of display system 50 are indicated by the same reference numerals.

Illumination source 152 includes multiple (e.g., three) color component light sources (e.g., lamps) 156R, 156G, and 156B that are positioned generally in a line and generate red, green, and blue light, respectively. A display controller 158 that separately controls MEMS reflectors 72 also activates color component light sources 156R, 156G, and 156B separately. During times that it successively activates color component light sources 156R, 156G, and 156B, display controller 158 applies control signals to MEMS reflectors 72 corresponding to red, green, and blue image components, thereby to form color component images in a field-sequential manner.

For example, color component images that are generated at a rate of 180 Hz can provide an image frame rate of 60 Hz. In one exemplary implementation, a display of 200×200 multi-color pixels could employ microlens arrays 62 with a 204×204 array of lenslets 64 to compensate for different optical paths taken by different color components of light forming the display gamut. Aperture plate 68 and MEMS reflective modulator 70 would include corresponding arrays of apertures 66 and reflectors 72, respectively. As an alternative implementation, it will be appreciated that multiple successive colors of illumination could be obtained by a spinning color wheel and a white light source, as is known in the art.

Figure 18:
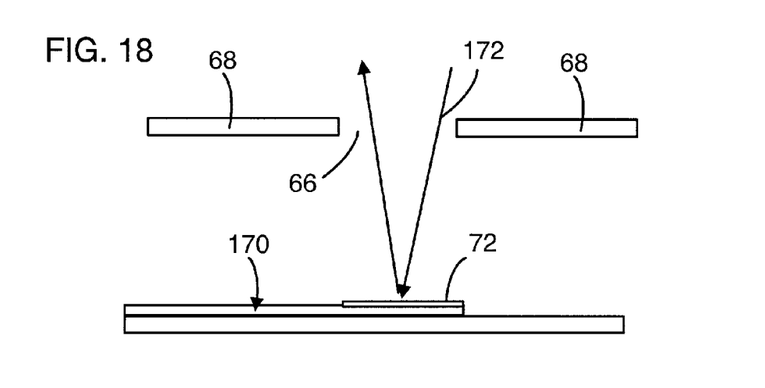
FIGS. 18 and 19 are schematic side views of an exemplary MEMS actuator in respective activated and relaxed states for controlling a MEMS reflector.
Figure 19:
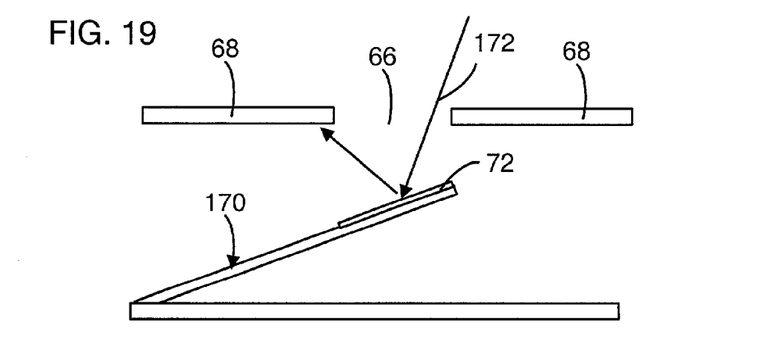

FIGS. 18 and 19 are schematic side views of an exemplary MEMS actuator 170 in respective activated and relaxed states for controlling MEMS reflector 72. FIG. 18 shows MEMS reflector 72 with an orientation behind an associated aperture 66 generally perpendicular to a light propagation direction 172. In this activated, display ON state, illumination light directed through aperture 66 is reflected by MEMS reflector 72 back through aperture 66 to be included in a display image. FIG. 19 shows MEMS reflector 72 with an inclined or a tilted orientation relative to light propagation direction 172. In this relaxed, display OFF state, illumination light directed through aperture 66 is reflected by MEMS reflector 72 toward a solid region of aperture plate 68 to be blocked and excluded from a display image.

Figure 20:
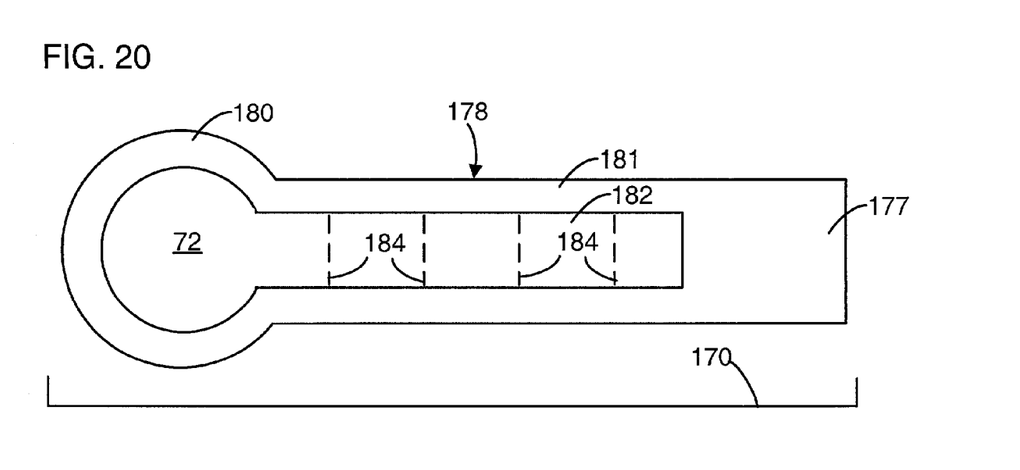
FIG. 20 is a plan view of a MEMS actuator used in optical display system of FIG. 16.
Figure 21:
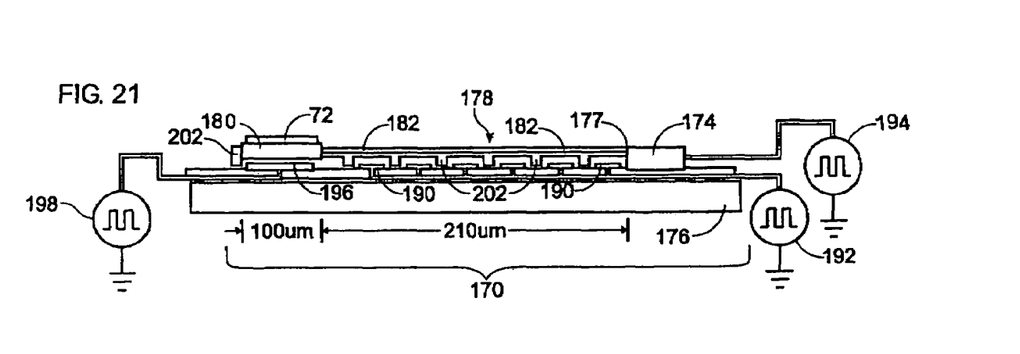
FIGS. 21 and 22 are side views of the MEMS actuator of FIG. 19 in respective activated and relaxed states.
Figure 22:
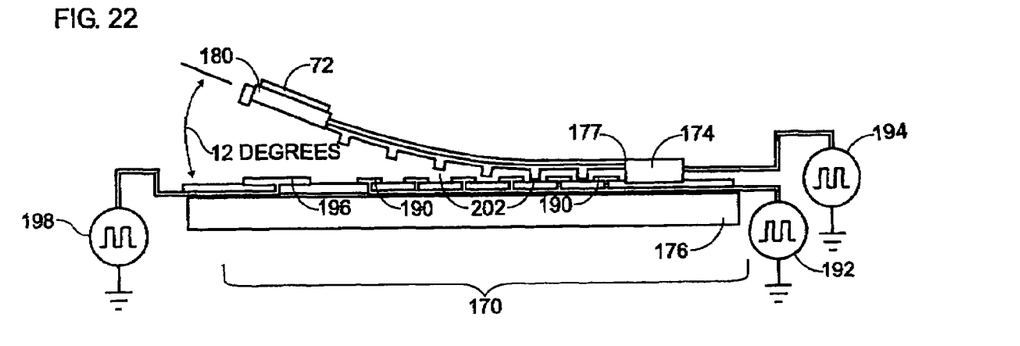

FIG. 20 is a plan view of MEMS actuator 170, and FIGS. 21 and 22 are side views of MEMS actuator 170 in its respective activated and relaxed states. MEMS actuator 170 is one of a variety of MEMS actuators that could be used to control MEMS reflector 72.

MEMS actuator 170 is an implementation of an electrostatic actuator and includes a structural anchor 174 (FIGS. 21 and 22) that is secured to a substrate 176 (e.g., substrate 10 or nitride layer 12, not shown). One end 177 of a cantilevered flexible arm 178 is secured to or formed integrally from anchor 174 and extends to a free or floating paddle end 180 that supports MEMS reflector 72 (e.g., formed of gold). Flexible arm 178 includes a semiconductor (e.g., polysilicon) arm base 181 and a residual stress layer 182 of a material other than the semiconductor (e.g., polysilicon) of arm base 181.

Residual stress layer 182 is formed of a material (e.g., gold) that is selected to have a coefficient of expansion different from that of the semiconductor (e.g., polysilicon) material of arm base 181. In the illustrated implementation, residual stress layer 182 is formed on top surface of arm base 181. The differing thermal coefficients of expansion of arm base 181 and residual stress layer 182 characterize flexible arm 178 as a bimorph.

Optional flex scores 184 may extend into a top surface of arm base 181 and extend across its length, either part way or completely (the former shown). Flex scores 184 are spaced apart from each other and are generally perpendicular to the length of flexible arm 178. In one implementation, residual stress layer 182 is formed between optional flex scores 184 when they are present.

MEMS actuator 170 includes one or more electrostatic activation electrodes 190 that are formed in or on substrate 176 at spaced-apart intervals along and underneath flexible arm 178. Activation electrodes 190 and flexible arm 178 are electrically connected to respective actuator controllers 192 and 194. An optional memory or lock electrode 196 is formed under floating paddle end 180 and electrically connected to an optional memory controller 198.

In the activated, display ON state illustrated in FIG. 21, complementary signals or electrical states are applied by actuator controllers 192 and 194 to respective activation electrodes 190 and flexible arm 178 to impart electrostatic attraction between them. The electrostatic attraction between activation electrodes 190 and flexible arm 178 functions to hold flexible arm 178 generally flat against substrate 176. Separate activation of optional memory controller 198, connected to a memory electrode 196, can then serve to hold flexible arm 178 generally flat against substrate 176 even after the complementary signals provided to activation electrodes 190 and flexible arm 178 are relaxed.

Stand-off dimples 202 extending from flexible arm 178 toward substrate 176 hold flexible arm 178 in spaced-apart relation to substrate 176 in the activated, display ON state. Dimples 202 contact the electrically insulating (e.g., nitride layer) of substrate 176. A dimple 202 at the end of paddle end 180 also keeps reflector 72 flat (i.e., parallel to substrate 176) in the activated, display ON state, as well as keeping flexible arm 178 spaced apart from memory electrode 196.

In the relaxed, display OFF state illustrated in FIG. 22, complementary signals or electrical states are not applied by actuator controllers 192 and 194 to respective activation electrodes 190 and flexible arm 178, or the complementary signals are insufficient to activate actuator 170. Likewise, optional memory controller 198 is not activated. Accordingly, residual stress between arm base 181 and residual stress layer 182 serves to bend, tilt, or "curl" flexible arm 178 out of the plane of the underlying substrate 176, as illustrated in FIG. 21.

In one implementation, reflector 72 in the relaxed, display OFF state rests at an orientation of about 12 degrees with respect to substrate 176. In one implementation, a transition time of about 1 ms is needed to activate or release actuator 170 (i.e., change between the relaxed, display OFF state and the activated, display ON state). It will be appreciated that this transition time can be changed, and substantially reduced.

Figure 23:
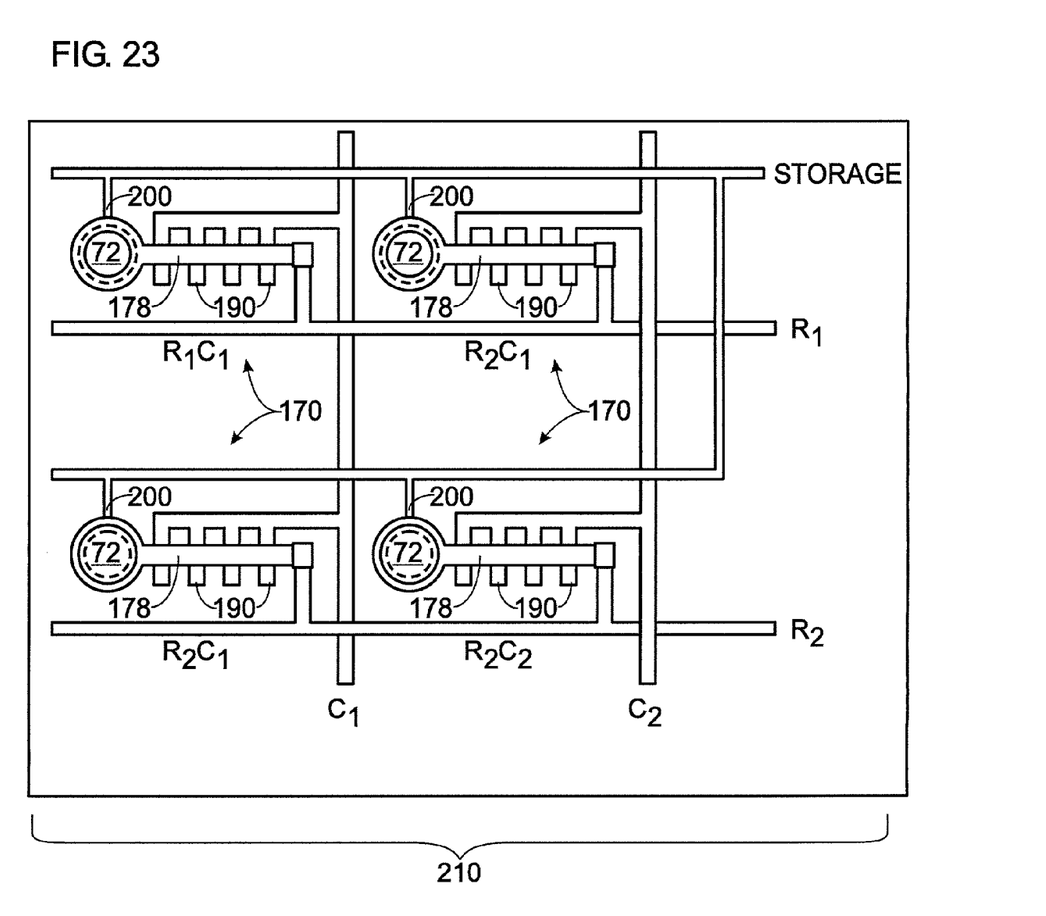
FIG. 23 is a schematic diagram of a 2×2 array of actuators having a storage or memory capability.

FIG. 23 is a schematic diagram of a 2×2 array 210 of actuators 170 having a storage or memory capability to illustrate the operation of actuators 170. The operation of array 210 is described with reference to the following activation or control signals:

Vse=storage electrode voltage

Ry=mirror arm voltage for Row-y

Cx=actuation electrode voltage for Column-x

As one exemplary implementation, actuation of a single actuator 170 at a location CxRy in array 210 (e.g., location C1R2) to activated, display ON state is accomplished by applying a row activation voltage (e.g., +60 volts) to a row electrode Ry (e.g., R2), which delivers the row activation voltage to the flexible arm 178 of each actuator in the row. A column activation voltage (e.g., −60 volts) is applied to a column electrode Cx (e.g., C1), which delivers the column activation voltage to the activation electrodes 190 of each actuator 170 in the column. These exemplary row and column activation voltages establish at actuator 170 at a location CxRy in array 210 (e.g., location C1R2) a voltage differential of 120 volts between flexible arm 178 and activation electrodes 190. With a voltage differential of at least 114 volts needed for actuation, the 120 volt differential is sufficient to activate the actuator 170.

The activation voltages need be applied only temporarily if a memory or storage voltage is applied to memory electrode 200 to establish a differential relative to the row activation voltage delivered to flexible arm 178. In particular, the activation voltages need be applied only long enough (e.g., 1 ms in one implementation) for flexible arm 178 to be deflected to and held by memory electrode 200.

With row and column electrodes other than row electrode Ry and column electrode Cx held at a median potential (e.g., 0 volts in one implementation), application of the row activation voltage to activation row electrode Ry and column activation voltage to column electrode Cx will function to activate only actuator 170 at location CxRy. With Ry=+60 volts and Cx=−60 volts, for example, other actuators 170 in row Ry and column Cx will each receive a voltage differential of only 60 volts, which is insufficient for actuation. Moreover, with storage or memory electrode 200 energized, all actuators 170 not specifically being activated will retain their previous states. For example, storage or memory electrode 200 may be energized with a voltage of +60 volts, for example. Such a memory or storage potential establishes between all storage electrodes 200 and actuators 170 that are not specifically being activated or addressed a differential of at least 25 volts that is sufficient to hold them in the display ON state.

Actuators 170 may be considered to have an actuation (or activation) state in which reflector 72 is moved into a flat (i.e., parallel to substrate 176) position for the activated, display ON state, a release state in which reflector 72 is released from the flat (i.e., parallel to substrate 176) position and curls out-of-plane for the relaxed, display OFF state, and a storage state in which in which reflector 72 is held in the flat (i.e., parallel to substrate 176) position after actuation. The actuation state and the storage state may be represented by the following equations:

$A_{xy}=|R_y-C_x|$=actuation potential difference for mirror RxCy $H_{xy}=|R_y-V_{se}|$=hold potential difference via storage electrode for mirrors on Ry Actuation (from the released state)

The mirror will transition to the actuated (down) state only if $A_{xy}>114$ volts.

Release (from the actuated state)

Figure 24:
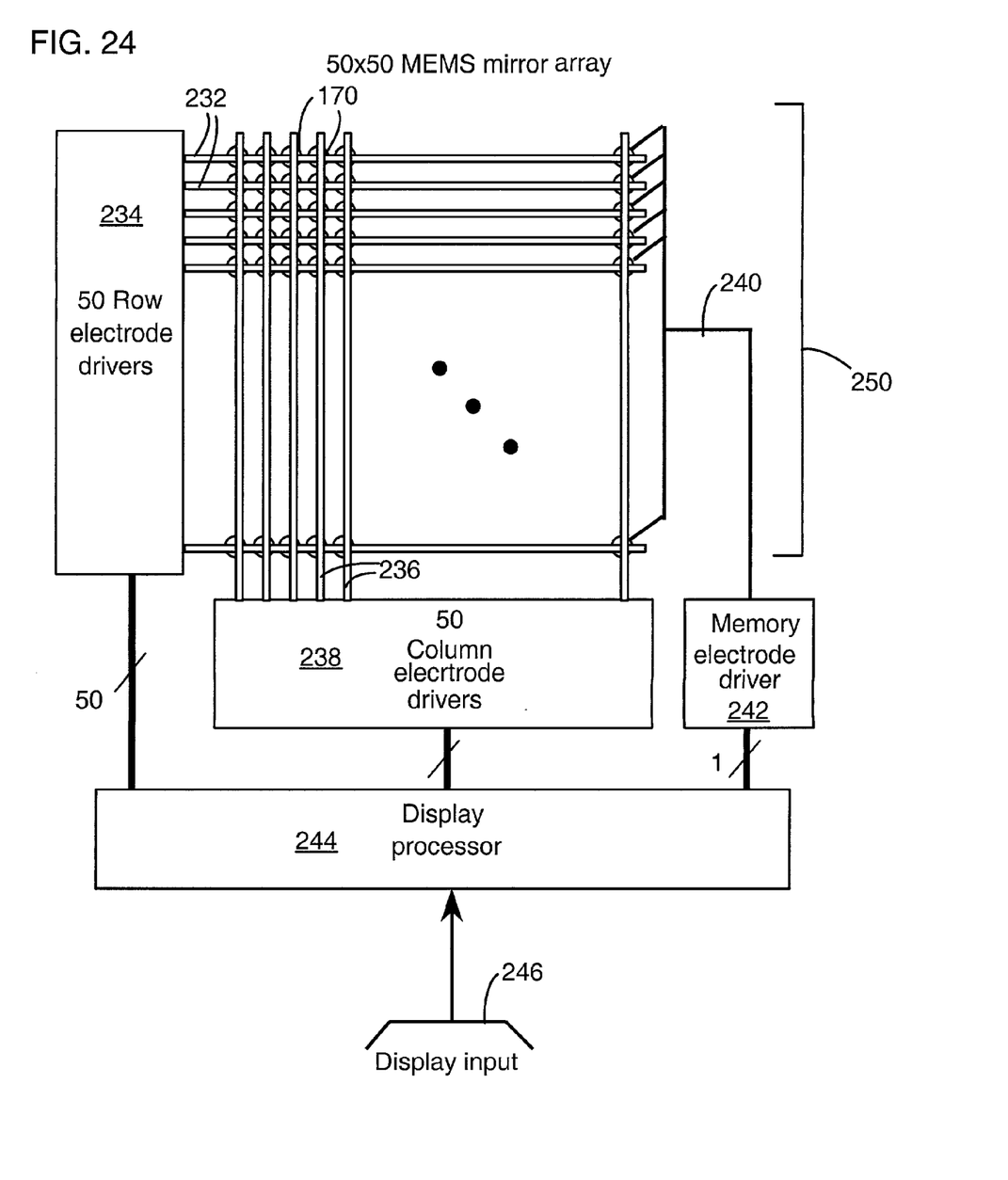
FIG. 24 is a schematic diagram of a 50×50 array of actuators having a storage or memory capability.

The mirror will transition to the released (up) state only if $A_{xy}<53$ volts and $H_{xy}<25$ volts Storage The mirror will retain its current state only if $A_{xy}>53$ volts or $H_{xy}>25$ volts if state=actuated $A_{xy}<114$ volts if state=released FIG. 24 is a fragmentary schematic diagram of a 50×50 array 230 of actuators 170 having a storage or memory capability. Array 230 employs 50 row electrodes 232 that are coupled to corresponding row drivers 234, 50 column electrodes 236 that are coupled to corresponding column drivers 238, and a common storage electrode 240 for all actuators 170 connected to a storage driver 242. It will be appreciated that row drivers 234 and column drivers 238 may include an individual driver for each of respective electrodes 232, and 236, or may include a lesser number of drivers that are multiplexed among the electrodes. Drivers 234, 238, and 242 and other electronics can be formed on substrate 176 or as separate devices, depending on complexity, packaging and economics. A display processor 244 receives display signals from a display input 246 and provides corresponding control signals to drivers 234, 238, and 242.

In this implementation, row drivers 234 switch between 0 and +60 volts, and column drivers 238 switch between 0, +60 and −60 volts. Storage electrode driver 242 switches between 0 and +60 volts. If the actuators 170 are sequentially addressed, a period of about 50×50×1 ms, or 2.5 seconds, will be needed to address all actuators 170 in array 230. It will be appreciated that only those actuators 170 with a reflector 72 requiring a state change need be addressed. Accordingly, less time would be required if fewer than all actuators 170 were to be addressed. If 50 row drivers 234 and 50 column drivers 238 are employed, whole rows or columns can be addressed simultaneously, and the actuators 170 in the rows or columns activated in parallel, thereby decreasing the array addressing period to about 50 ms.

Figure 25:
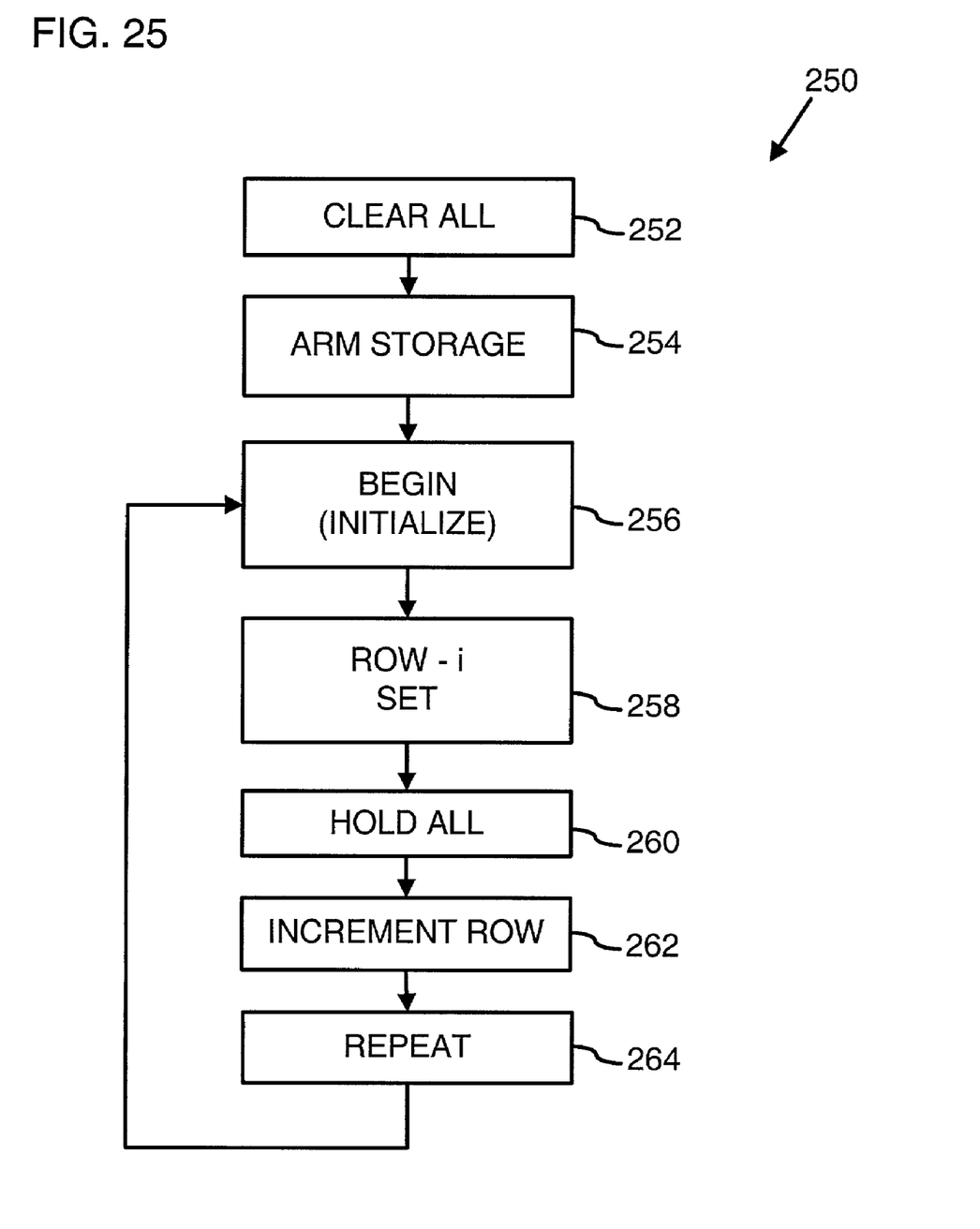
FIG. 25 is a flow diagram of a row-sequential addressing method.

FIG. 25 is a flow diagram of a row-sequential addressing method 250 described with reference to the exemplary implementation of actuator 170 and array 230 described above. It will be appreciated that row-sequential addressing method 250 could be readily adapted to other implementations of actuators 170 and arrays 230.

Step 252 indicates a "Clear All" step in which the reflectors 72 of all actuators 170 in array 250, for example, are returned to a relaxed, no display state. The Clear All of step 252 is optional and may be represented by the following drive voltages:

Vse=Ry=Cx=0 volts (for all x and y).

Step 254 indicates an "Arm Storage" step in which the storage electrodes 240 for all actuators 170 are activated or energized by storage driver 242. The Arm Storage of step 254 may be represented by the following drive voltage:

Vse=+60 volts.

Step 254 applies +60 volts to storage electrodes 240 so any activated actuator 170 is held in its activated, display ON state until released. This step does not affect actuators in the relaxed, display OFF because the activation of storage electrodes 240 is insufficient to activate an actuator 170 in the relaxed state.

Step 256 indicates a "Begin" step in which a counter of rows or columns (e.g., rows) is initialized at a value "1." Step 258 sets the row counter "i" to a first row of actuators 170 in array 230. The Begin of step 256 may be represented as:

Set "i"=1.

Step 258 indicates a "Row-i Set" step in which the storage electrodes 240 for all actuators 170 are activated or energized by storage driver 242. The Row-i Set of step 258 may be represented by the following drive voltages:

Set Ry=i=+60 volts,
Cx=data states for Ry=iC1, Ry=iC2, . . . , Ry=iC50.

To activate actuators 170 within Row-i (Ry=i=+60 volts), set Cx=−60 volts, giving an activation differential:

(Ax,y=i=|60−(−60)|=120 volts=>mirror is actuated).

To release actuators 170 within Row-I, (Ry=i =+60 volts), set Cx=+60 volts, giving a release differential:

(Ax,y=j =|60−60 |=0 volts, Hx,y=j =|60 −60 |=0 volts (no hold)

For mirrors other than in Row-i (Ry≠i =0 volts)
Ax,y≠i =|0−Rx|=(0 or 60) volts. insufficient for actuation.
Hx,y≠i =|0−60 |=60 volts sufficient for holding states It will be noted that there is no hold function within Row-i in this step, since Hx,y=i =0 volts. Accordingly, step 258 sets (or releases previously actuated and held) the states of actuators 170 in Row-i to their required new positions.

Step 260 indicates a "Hold All" step in which all row and column electrodes are set to a neutral potential (e.g., 0 volts) and the storage electrodes 240 for all actuators 170 are activated or energized by storage driver 242 sufficient for holding the current states. The Hold All of step 260 may be represented by the following drive voltages:

All Ry=0 volts and all Cx=0 volts
Hxy=60 volts

Step 262 indicates an "Increment Row" step in which counter "i" is incremented by a count of one. Step 262 then proceeds to step 264.

Step 264 indicates a "Repeat" step that returns to step 256. Step 264 returns to step 258 repeatedly until all rows are addressed (e.a., until count "I"=50.

In the exemplary implementation described above, an activation potential of greater than 114 volts between flexible arm 178 and activation electrodes 190 establishes sufficient electrostatic force to pull curled flexible arm 178 in its relaxed state toward substrate 176. As a result, dimples 202 are pulled against substrate 176 and reflector 72 lies flat, nominally at 0 degrees, in an activated, display ON state.

Figure 26:
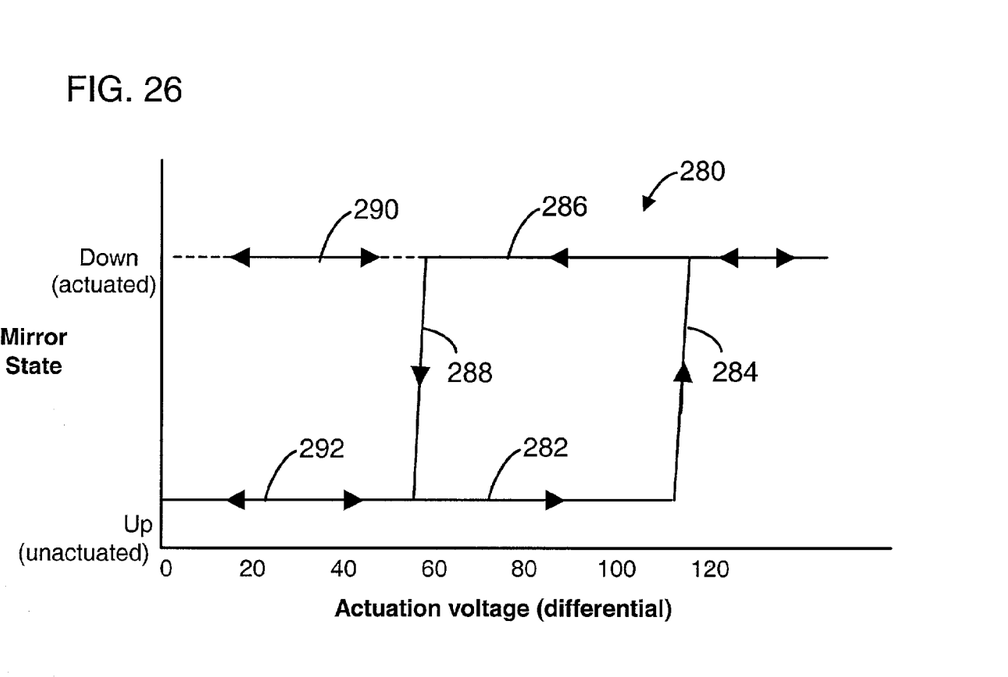
FIG. 26 is a graph illustrating hysteresis characteristics of a MEMS actuator with respect to applied voltage differentials.

FIG. 26 is a graph 280 illustrating hysteresis characteristics of an actuator 170 with respect to applied voltage differentials. As shown in FIG. 26, actuator 170 exhibits hysteresis effects such that after activation at about 114 volts, the applied voltage differential needs to be reduced below 53 volts for actuator 170 to be released.

A bottom horizontal segment 282 illustrates that the voltage differential between activation electrodes 190 and flexible arm 178 needs to be increased to about 114 volts to move flexible arm 178 from a relaxed upward state to an activated downward state, the transition being illustrated by vertical segment 284. A top horizontal segment 286 illustrates that the voltage differential then needs to be decreased to about 53 volts to move flexible arm 178 from an activated downward state to a relaxed upward state, the transition being illustrated by vertical segment 288.

A storage activated segment 290 illustrates activation of storage electrodes 240 and shows that flexible arm 178 remains in the activated downward state even as the voltage differential between activation electrodes 190 and flexible arm 178 is reduced to below 53 volts. In the illustrated implementation, activation of storage electrodes 240 includes a voltage difference of greater than 25 volts (e.g., 60 volts) between storage electrode 240 and flexible arm 178. In contrast, a storage not-activated segment 292 illustrates absence of activation of storage electrodes 240 (e.g., 0 volt) and shows flexible arm 178 returning to its relaxed upward state when the voltage differential between activation electrodes 190 and flexible arm 178 is reduced to below 53 volts.

It will be appreciated that the hysteresis of actuator 170 allows it to be operated and held in its activated downward state without use of storage electrodes 240. Such an operation requires closer tolerances as to the row and column drive voltages and can be more sensitive to process or manufacturing variations that may cause operation failure. Nevertheless, actuator 170 can be operated without storage electrodes 240 to provide a simpler layout and to eliminate the requirement for storage drivers.

With reference to the exemplary MUMPS manufacturing process, arm base 181 may be formed as a singly clamped cantilever of 1.5 μm thick polysilicon patterned on the Poly 2 layer. Activation electrode 190 may be formed from the Poly 0 layer. Dimples 202 may be formed in the Poly 2 layer with Anchor 1 (i.e., a hole in the 2 μm Oxide 1 layer) to provide a stand-off of 2 μm, thereby to prevent the major bottom surface of flexible arm 178 from electrically contacting activation electrode 190 when actuated. Residual stress layer 182 may be formed as a 0.5 μm thick layer of gold. Reflector 72 may also be coated with gold to increase optical reflectance.

Figure 27:
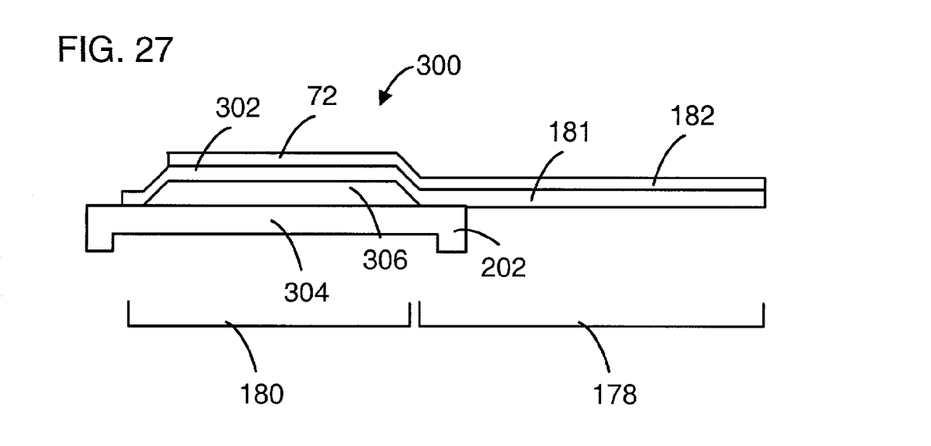
FIG. 27 is a schematic sectional side view of a mirror portion of a MEMS actuator having a composite structure.

Paddle end 180 of flexible arm 178 may be formed to resist the curling from residual stress characteristic of the rest of arm 178. FIG. 27 is a schematic sectional side view of one implementation paddle end 180 formed as a relatively thick composite structure 300 of, for example, a 1.5 μm thick layer 302 of Poly 2 (i.e., the material of arm base 181), as well as a 2 μm thick layer 304 of Poly 1 (which includes dimples 202) and a 0.75 μm thick layer 306 of trapped Oxide 2 between layers 302 and 304.

Parts of the description of the preferred embodiment refer to steps of the MUMPs fabrication process described above. However, as stated, MUMPs is a general fabrication process that accommodates a wide range of MEMS device designs. Consequently, a fabrication process that is specifically designed for the present invention will likely include different steps, additional steps, different dimensions and thickness, and different materials. Such specific fabrication processes are within the ken of persons skilled in the art of photolithographic processes and are not a part of the present invention.

In view of the many possible embodiments to which the principles of our invention may be applied, it should be recognized that the detailed embodiments are illustrative only and should not be taken as limiting the scope of our invention. Rather, I claim as my invention all such embodiments as may come within the scope and spirit of the following claims and equivalents thereto.

The invention claimed is:

1. A microelectrical mechanical optical display engine, comprising:
   a microlens array having an array of plural lenslets for receiving and directing illumination light;
   an aperture plate through which plural pixel apertures extend, the plural pixel apertures being aligned with and to receive illumination light from the plural lenslets of the microlens array; and a microelectrical mechanical reflector array positioned opposite the aperture plate from the microlens array, the microelectrical mechanical reflector array including plural microelectrical mechanical actuators that support reflectors in alignment with the plural pixel apertures to receive and reflect the illumination light, the plural microelectrical mechanical actuators being constructed and arranged to orient the reflectors selectively to direct the illumination light back through the pixel apertures or against the aperture plate, wherein a microelectrical mechanical actuator is placed in an actuated state having an actuated position by an actuation voltage and held in a storage state to maintain the actuated position by a storage voltage, wherein the storage voltage is less than the actuation voltage.

2. The display engine of claim 1 further comprising:
an illumination source constructed and arranged to provide illumination light and
a collimating lens constructed and arranged to receive and collimate the illumination light.

3. The display engine of claim 2 further comprising a selective reflector positioned to receive the illumination light from the collimating lens and to direct the illumination light to the microlens array.

4. The display engine of claim 3 in which the selective reflector is constructed and arranged to transmit the illumination light from the pixel apertures toward the display screen.

5. The display engine of claim 4 in which the selective reflector includes a beamsplitter.

6. The display engine of claim 2 in which the microelectrical mechanical reflector array is formed on a planar substrate and the plural microelectrical mechanical actuators support the reflectors on actuator arms that in the actuated state are co-planar with the substrate and the reflectors.

7. The display engine of claim 2 in which the illumination source includes only one light source.

8. The display engine of claim 2 in which the illumination source is monochromatic.

9. The display engine of claim 2 in which the illumination source is polychromatic.

10. The display engine of claim 9 in which the illumination source is constructed and arranged to provide different chromatic segments of the illumination light over different successive tune periods.

11. The display engine of claim 1 in which the microelectrical mechanical actuators are electrostatic microelectrical mechanical actuators.

12. The display engine of claim 11 in which the microelectrical mechanical actuators have actuated and released states, only one of which requires electrostatic activation.

13. The display engine of claim 11 in which the plural microelectrical mechanical actuators support the reflectors on actuator arms that are formed as bimorphs having a characteristic residual stress.

14. The display engine of claim 13 in which the microelectrical mechanical actuators include an electrostatic activation electrode that applies a force against the characteristic residual stress of the actuator arms.

15. The display engine of claim 14 in which the microelectrical mechanical actuators are constructed and arranged to orient the reflectors selectively according to drive signals provided by a display driver, the engine further comprising an orientation storage system separate from the electrostatic activation electrode to selectively hold the microelectrical mechanical actuators in the storage state.

16. The display engine of claim 1, further comprising a display screen that receives the illumination light reflected from the microelectrical mechanical reflector array.

17. The display engine of claim 16 in which the display screen is a transmissive display screen.

18. The display engine of claim 1 wherein each microelectrical mechanical actuator includes:
a substrate;
an arm having a first end anchored to the substrate and a free end extending over the substrate, the arm having a bottom surface facing the substrate and a top surface opposite the bottom surface;
a reflector extending over the top surface of the free end of the arm;
an electrostatic activation electrode supported by the substrate and facing the bottom surface of the arm, the electrode, when activated by the actuation voltage, providing an electrical force sufficient to move the free end of the arm; and
an electrostatic lock, supported by the substrate and facing the bottom surface of the arm, the electrostatic lock, when activated by the storage voltage, providing an electrical force sufficient to hold the free end of the arm in position.

19. The display engine of claim 18 wherein each microelectrical mechanical actuator includes at least one stand-off dimple, the dimple spacing the free end of the arm away from the substrate.

20. The display engine of claim 18 wherein the top surface of the arm includes at least one flex score extending across at least a portion of a width of the arm, wherein the free end of the arm proximate to the reflector is free of the at least one flex score.

21. The display engine of claim 18 wherein the electrostatic lock is supported by the substrate beneath the free end of the arm.

22. The display engine of claim 18 wherein the arm is formed of a bimorph material, the material having a relaxed state.

23. The display engine of claim 22 wherein the arm flexes away from the substrate in the relaxed state.

* * * * *